US007257322B2

(12) United States Patent
Staller

(10) Patent No.: US 7,257,322 B2
(45) Date of Patent: Aug. 14, 2007

(54) PHOTOGRAPHIC STROBE DIFFUSER

(76) Inventor: Norman D. Staller, 36 Ober St., Beverly, MA (US) 01915

( * ) Notice: Subject to any disclaimer, the term of this patent is extended or adjusted under 35 U.S.C. 154(b) by 270 days.

(21) Appl. No.: 11/134,217

(22) Filed: May 20, 2005

(65) Prior Publication Data

US 2006/0263081 A1    Nov. 23, 2006

(51) Int. Cl.
G03B 15/03    (2006.01)
G03B 17/00    (2006.01)
(52) U.S. Cl. .............................. 396/198; 396/420
(58) Field of Classification Search ............. 396/6, 396/419–420, 198
See application file for complete search history.

(56) References Cited

U.S. PATENT DOCUMENTS

| 5,381,198 A | * | 1/1995 | Mauchan | 396/317 |
| 5,448,323 A |   | 9/1995 | Clark et al. | 354/167 |
| 6,094,545 A |   | 7/2000 | Petitjean | 396/544 |
| 6,816,672 B2 | * | 11/2004 | Mikami et al. | 396/6 |

FOREIGN PATENT DOCUMENTS

| JP | 03 196032 | 8/1991 |
| JP | 1995-270865 A | 10/1995 |
| JP | 1995-306453 A | 11/1995 |
| JP | 1997-197525 A | 7/1997 |
| JP | 2002-250969 A | 9/2002 |
| WO | 2001-71418 A2 | 9/2001 |
| WO | 2001-71418 A3 | 9/2001 |

* cited by examiner

Primary Examiner—Christopher Mahoney
(74) Attorney, Agent, or Firm—Woodcock Washburn LLP

(57) ABSTRACT

A strobe diffuser attachment for a camera, includes a diffuser body adapted for attachment to a camera, a pair of spaced diffuser lenses mounted in the diffuser body and adapted to be located in front of a range of different integral strobe locations for a camera attached to the body, wherein the pair of diffuser lenses are adapted to serially diffuse light emitted from an integral strobe of a camera attached to the body. A distance measurement device uses a pair of light beams which intersect at a repeatable distance from the diffuser body to readily enable positioning of an object to be photographed at that repeatable distance.

24 Claims, 3 Drawing Sheets

PHOTOGRAPHIC STROBE DIFFUSER

The present invention generally relates to flash or strobe photography, and in particular to diffusing strobe light for close range photography.

BACKGROUND OF THE INVENTION

One of the more refined techniques of photography is the balancing of light on the photographic subject, and the simple use of a flash does not always solve such balancing problems or achieve the desired results. This problem is more acute in close range photography where a flash can easily produce both bright spots and shadows on a subject. Many photographers use a separate synchronized strobe if only to get more balanced lighting. Many strobes also include a diffuser lens which helps to some extent to even out the strobe light.

The problem is also more acute for cameras used in non-professional photography, which cameras typically include a built-in or integral flash unit. Such integral strobes may be optimally designed to produce adequate light at intermediate or further distances and thus produce too much light at closer distances. Even further challenges are caused by the modem trend of camera miniaturization where the size and location of the integral strobe with respect to the lens is very confined.

With the widespread use of digital photograph and the resulting greater use of digital photography in more aspects of life and business, this glare and shadow problem is a limiting factor. It is therefore desirable to resolve these problems in an efficient and convenient manner, which allows use of currently available cameras and which does not require additional skill or training for the photographer.

SUMMARY OF THE INVENTION

In one embodiment, a strobe diffuser attachment for a camera, comprises a diffuser body adapted for attachment to a camera, a pair of spaced diffuser lenses mounted in the diffuser body and adapted to be located in front of a range of different integral strobe locations for a camera attached to the body, wherein the pair of diffuser lenses are adapted to serially diffuse light emitted from an integral strobe of a camera attached to the body.

The pair of diffuser lenses may be adapted to be located in front of substantially all camera frontal surface located above approximately a center of a lens of a camera attached to the diffuser body.

The diffuser body may include a front wall having a camera lens opening and may be adapted for aligning a lens of a camera attached to the diffuser body with the camera lens opening. The pair of diffuser lenses may be located to cover substantially all camera frontal area located above approximately a center of the camera lens opening for a camera attached to the diffuser body. The diffuser body may further include a shroud located around the camera lens opening and adapted to reduce any strobe light emissions through the camera lens opening.

The diffuser body may include a platform mounted orthogonal to the front wall and adapted to allow attachment to a bottom of any one of a variety of cameras with a camera lens aligned with the camera lens opening. The platform may include one or more elongated slots aligned parallel to the front wall and adapted for camera attachment at adjustable positions along each slot to enable alignment of a camera lens with the cameral lens opening. The one or more elongated slots may include a plurality of elongated parallel slots located at different distances from the front wall. The platform may include a screw adapted to mate with a standard camera bottom screw mount through a selectable one of the plurality of elongated slots.

The platform may be affixed to the front wall by an adjustable slide adapted to fix the platform at an adjustable distance from the camera lens opening. The platform may be rotatably mounted to the adjustable slide and adapted to allow the platform to be alternately positioned both orthogonal to the front wall for use and adjacent and parallel to the front wall for storage purposes.

The strobe diffuser may further comprise an adjustable stop adapted to prevent relative rotation between the front wall and any one of a variety of cameras attached to the platform. The adjustable stop may include a spring biased stop element adapted to extend from the front wall and abut a camera attached to the platform, and the adjustable stop may include a locking device adapted to fix a position of the stop element when the stop element is abutting a camera attached to the platform.

The diffuser may include a distance measurement device adapted to readily enable positioning of an object to be photographed at a repeatable distance from the diffuser body. The distance measurement device may include a pair of light beams which intersect at the repeatable distance from the diffuser body. The pair of light beams may be adapted to form a centering spot for aiming a camera attached to the diffuser body. The distance measurement device may be adapted to selectively produce one of a plurality of pairs of light beams which intersect at different repeatable distances from the diffuser body. The plurality of pairs of light beams may be emitted from the diffuser body at a different relative angle. Each light beam may be produced by an LED and a focusing lens, and different angular beams may be produced from a single lens having a separate LED differently aligned with the single lens. The measurement device may include a pair of LEDS aligned at different angular positions from a single lens to produce two different light beams having different angular relationships with the diffuser body.

In another embodiment of the present invention, a strobe diffuser attachment for a camera includes a diffuser body adapted for attachment to a camera, one or more diffuser lenses attached to the diffuser body and adapted to diffuse light from a strobe of a camera attached to the diffuser body; and a distance measurement device located in the diffuser body and adapted to readily enable positioning of an object to be photographed at a repeatable distance from the diffuser body, wherein the distance measurement device includes a pair of light beams which intersect at the repeatable distance from the diffuser body.

The distance measurement device may be adapted to selectively produce one of a plurality of pairs of light beams, each pair of which is emitted from the diffuser body at a different relative angle and intersects at a different repeatable distance from the diffuser body. Each light beam may be produced by an LED and a focusing lens, wherein different angular beams are produced from a single lens having a separate LED differently aligned with the single lens. The measurement device may include a pair of LEDS aligned at different angular positions from a single lens to produce two different light beams having different angular relationships with the diffuser body.

The pair of light beams may be adapted to form a centering spot for aiming a camera attached to the diffuser body. The pair of light beams may be adapted to intersect along a centerline of a lens of a camera attached to the diffuser body.

BRIEF DESCRIPTION OF THE DRAWINGS

The present invention is illustratively shown and described in reference to the accompanying drawings, in which:

FIG. 4 is a functional view of the diffuser of FIG. 1 being used with a camera to take a picture of a subject at a verifiable distance there from.

DETAILED DESCRIPTION OF THE DRAWINGS

The present invention significantly improves upon strobe light diffusion for close range photography by providing a simple and economical device which diffuses strobe light and is adapted to attach to a wide variety of available cameras. The device may further include a distance measurement device or indicator which further enhances close range photography by allowing the device and its attached camera to be easily located at a predetermined distance from a subject for multiple photographs and different subjects. The distance indicator further provides a convenient aiming spot for easy camera use.

Figure 1:
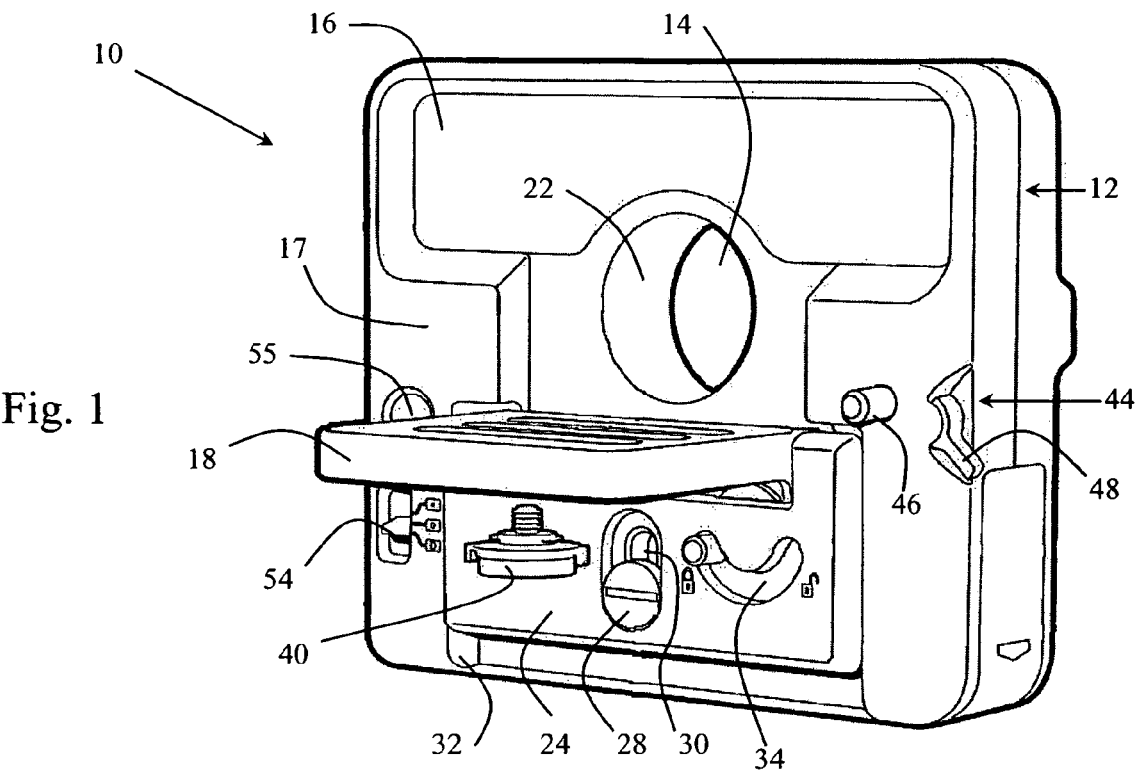
FIG. 1 is a perspective view of the rear side of a strobe diffuser constructed in accordance with one embodiment of the present invention.

FIG. 1 shows a strobe diffuser 10, generally including a diffuser body 12 having a camera lens opening 14 and a first diffuser lens 16. Lens opening 14 is formed through a front wall 17 of diffuser body 12. Lens 16 is one of a pair of diffuser lenses adapted to serially diffuse strobe light emitted from one of a wide variety of cameras attached to diffuser body 12.

Figure 2:
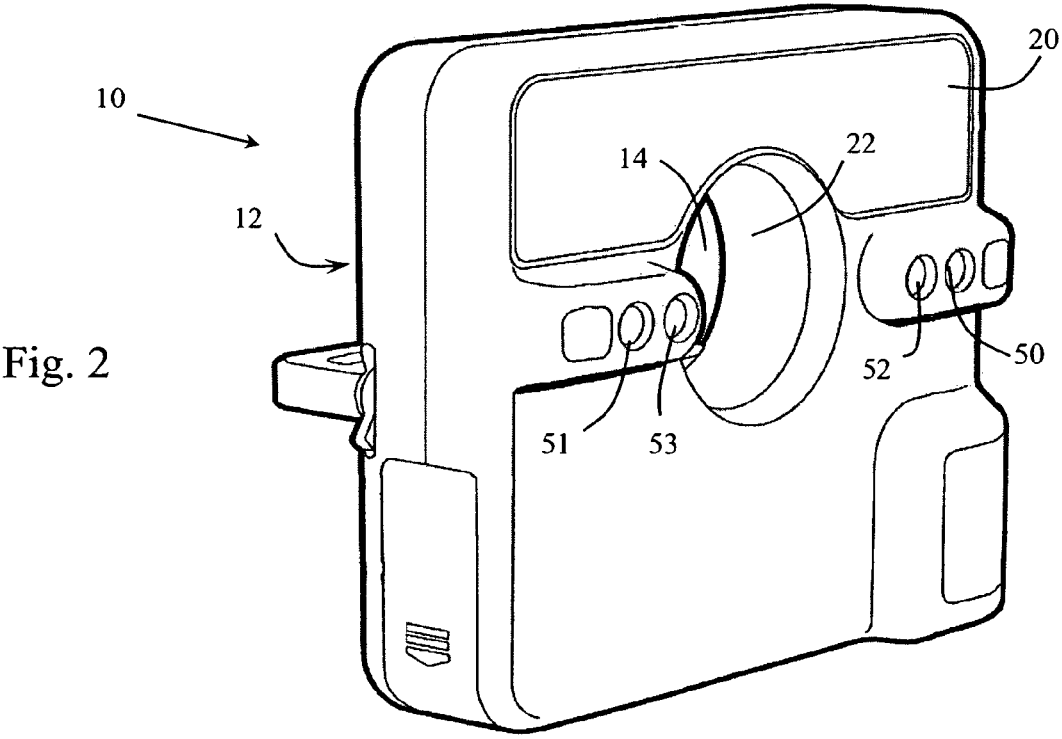
FIG. 2 is a front perspective view of the diffuser of claim 1.

FIG. 2 is a frontal view of diffuser 10 showing a second diffuser lens 20, which is spaced from diffuser lens 16 (FIG. 1) by its mounting in diffuser body 12. In this manner, first and second diffuser lenses 16, 20 are adapted to serially diffuse strobe light directed toward a photograph subject and emitted from a camera attached to diffuser 10. In one embodiment, lenses 16, 20 are mounted parallel to each other.

It should be noted that diffuser lens 16 covers substantially all of the area of diffuser body 12 located above approximately a horizontal midline of camera lens opening 14. In this manner, diffuser lens 16 is adapted to be located in front of a range of possible integral strobe locations for a camera attached to diffuser body 14. Diffuser lens 16 is further adapted to be located in front of substantially all frontal surface of a camera attached to diffuser body 14 and located above approximately a center of a lens of such camera. Diffuser lens 16 is also located to cover substantially all frontal area of a camera located above approximately a center of camera lens opening 14.

Any suitable optical function may be incorporated into lenses 16, 20. The amount of diffusion and absorption of lenses 16, 20 may be selected from a range of available values in accordance with known optics and material performance. Likewise, any suitable material may be used for lenses 16, 20. The optical properties and material of each lens 16, 20 may be the same or different, as desired.

Referring back to FIG. 1, diffuser body 12 is adapted for attachment to any one of a variety of different cameras by means of an adjustable platform 18, which may be located at a vertically adjustable distance from camera lens opening 14 in the view of FIG. 1. In this manner, the lens of any one of a variety of cameras may be aligned with a camera lens opening 14 by adjustment of the distance of platform 18 from camera lens opening 14.

Both FIGS. 1 and 2 show a shroud 22 located around camera lens opening 14. Shroud 22 is adapted to reduce or eliminate the emission of any strobe light through camera lens opening 14, thus allowing strobe light reaching a photograph subject to be controlled by diffuser lenses 16, 20.

As mentioned, platform 18 extends from diffuser body 12 as shown in FIG. 1 and is adjustable with respect to its distance from camera lens opening 14. Platform 18 is attached to a slide or mounting member 24. Mounting member 24 is adjustably mounted to diffuser body 12 by a screw 28, which passes through a slot 30 located in mounting member 24. Loosening screw 28 allows adjustment of mounting member 24, and thereby platform 18, with respect to its distance from camera lens opening 14. Mounting member 24 is further confined to movement directly towards and away from camera lens opening 14 by means of a partial channel 32 formed in the rear surface of front wall 17.

Figure 3:
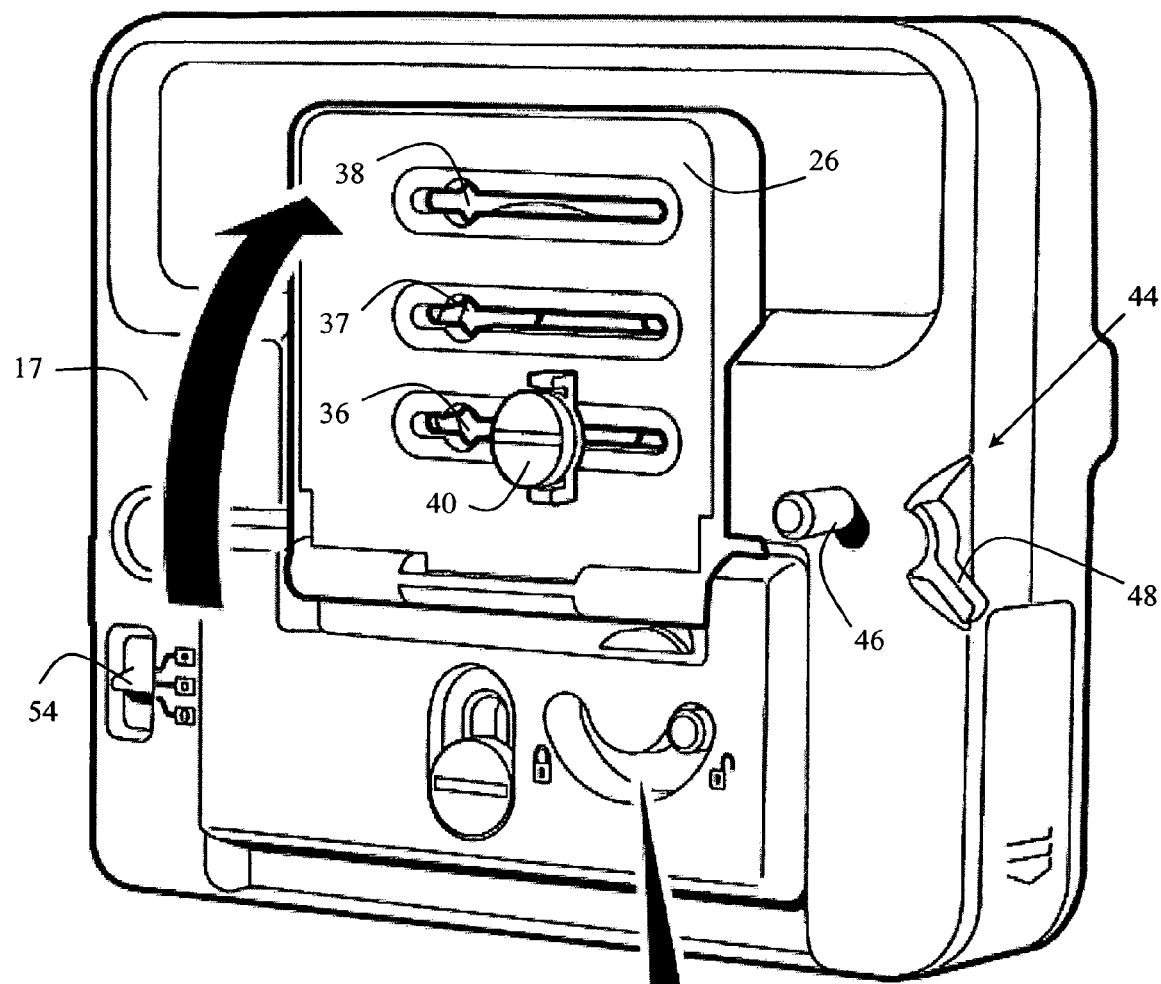
FIG. 3 is another rear perspective view of the diffuser of claim 1, wherein a rotatable platform is located in an alternative position from that of FIG. 1.
Figure 3:
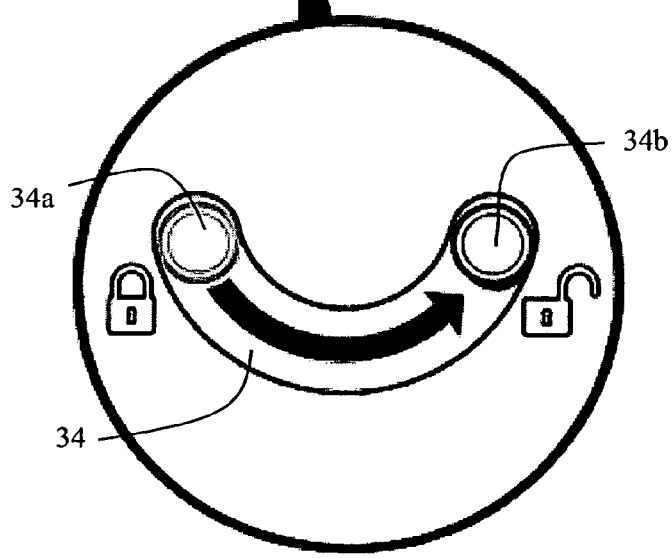

Platform 18 is rotatably mounted to slide or mounting member 24 to allow rotation between an orthogonal position with respect to diffuser body 12, as shown in FIG. 1, and a parallel or flat position with respect to diffuser body 12, as shown in FIG. 3. The position of platform 18 in FIG. 3 is more suitable for storage of diffuser 10.

The relative rotational position of platform 18 with respect to mounting member 24 is fixed by a rotatable cam 34 mounted within member 24. Rotatable cam 34 may be moved from a locked position 34a to an unlocked position 34b to allow rotation of platform 18 between its orthogonal and flat positions. The locked position 34a of cam 34 conversely prevents rotation of platform 18.

FIG. 3 also shows the further flexibility for mounting different sized cameras to diffuser 10. Platform 18 includes a multiplicity of elongated slots 36-38 passing through platform 18 and oriented adjacent and parallel to each other and parallel to front wall 17 of diffuser body 12. A screw 40 is shown for mounting a camera to the top or opposing side (not shown) of platform 18 by means of a standard camera threaded mount. Each slot 36-38 individually allows adjustment of the mounted camera position laterally with respect to camera lens opening 14 (FIGS. 1 and 2). Slots 36-38 collectively accommodate the mounting of cameras having different relative thicknesses, with each respective slot 36-38 having a different relative distance from camera lens opening 14 in the orthogonal position for platform 18 of FIG. 1.

In the above described manner, a wide variety of different cameras may be mounted to diffuser body 12 with their respective lenses located in lens opening 14. The preferred alignment for such cameras is to center the respective lens within lens opening 14 and to use the closest possible slot to front wall 17.

FIGS. 1 and 3 further show an adjustable stop 44 mounted in diffuser body 12 and including a spring biased stop element 46 and a locking device 48 for stop element 46. Stop element 46 is spring biased to extend from diffuser body 12 towards a camera mounted on platform 18 in FIG. 1. Before a camera is attached, stop element 46 is pressed into diffuser body 12 and locking device 48 is engaged to hold it there. Once a camera is attached to platform 18 with its respective lens aligned with lens opening 14, locking device 40 is released and stop element 46 extends until it makes contact with the camera. At this time, locking device 48 is engaged to fix the position of stop element 46. By this arrangement, a photographer using diffuser 10 cannot cause relative angular movement and misalignment between diffuser 10 and a camera mounted thereto by hand pressure applied on the right side of the camera and diffuser 10, where most cameras have their shutter release.

Figure 4:
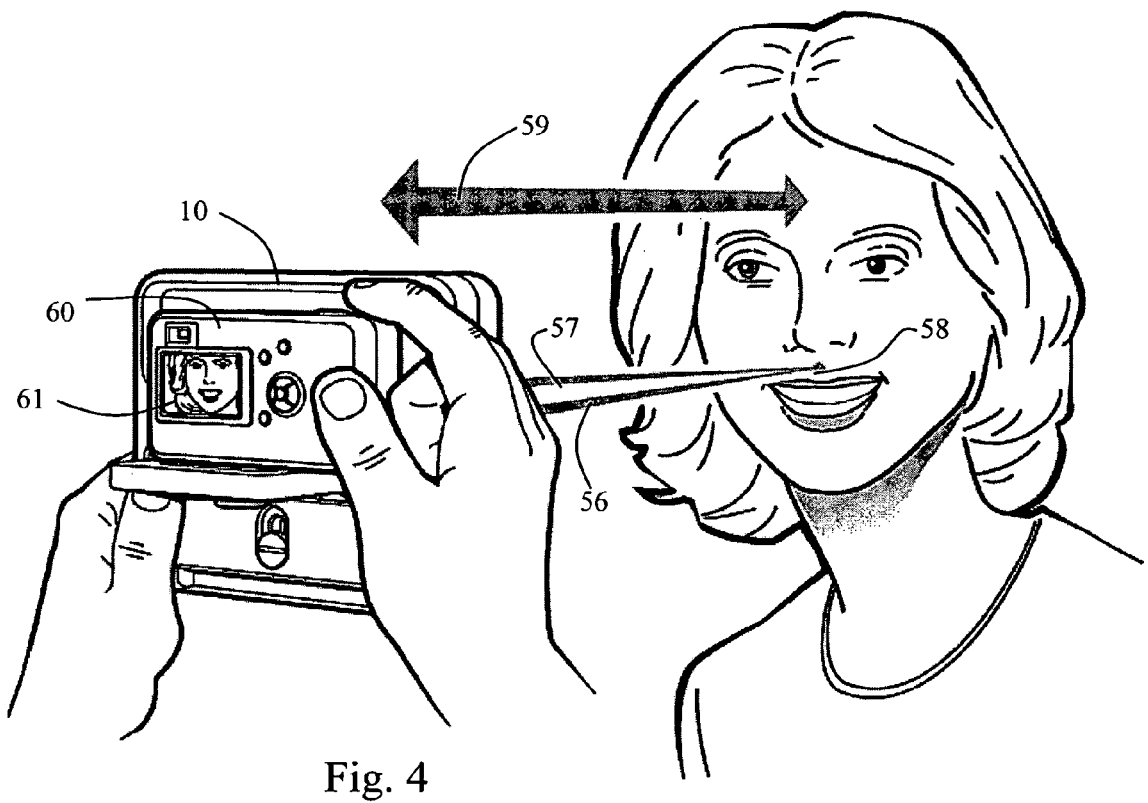

Diffuser 10 further includes a distance measurement device or indicator in the form of a plurality of light beam emitters 50-53 (FIG. 2). Light beam emitters 50-53 are paired 50-51 and 52-53 on opposing sides of camera lens opening 14. Each pair of emitters 50-51, 52-53 creates a pair of angled light beans which intersect at different distances in front of diffuser body 12. Each of the pairs of light beams allows diffuser 10 to be relocated at the same repeatable distance from a subject as demonstrated in FIG. 4. More specifically, light beams 56, 57 intersect at spot 58 which is always located at the same repeatable distance 59 from diffuser 10.

Additionally, the different pairs of light beams are set up to intersect along a centerline of lens opening 14 and thereby along a centerline of the lens of a camera 60 attached to diffuser body 12. This allows spot 58 to be easily used for aiming camera 60 and composing the picture, without having to look at camera display 61. This feature is facilitated by concentric alignment of the camera lens within lens opening 14.

It is preferred that the different pairs of light beams be emitted from diffuser body 12 at different relative angles thereto. This feature increases the distance between the intersecting points of different pairs of light beams than would be provided by parallel pairs of light beams.

Control of emitters 50-53 is provided by a selector switch 54 and a push button 55. Selection of emitter pairs 50-51, 52-53 thus provides a plurality of repeatable distances for diffuser 10. Push button 55 turns on the selected pair of light beams and starts a timer which automatically turns off the selected light beams after several seconds. In a further refinement, emitters 50-53 are switched off when a preliminary light flash is generated by the camera. Diffuser 10 is preferably used with cameras that use through-the-lens light metering. Such cameras typically fire a small preliminary strobe and use the sensed light to set the amount of strobe light for the picture. This preliminary strobe is sensed by a sensor (not shown) in diffuser 10 and causes the aiming beam to be extinguished before the picture is taken. Any suitable circuitry may be used to provide the above-described control ability and thus prevent taking photographs having a light spot on the middle of the subject. Suitable cameras which use the above-mentioned through-the-lens metering are available from Cannon, Hewlett-Packard, Olympus and Pentax.

Figure 5:
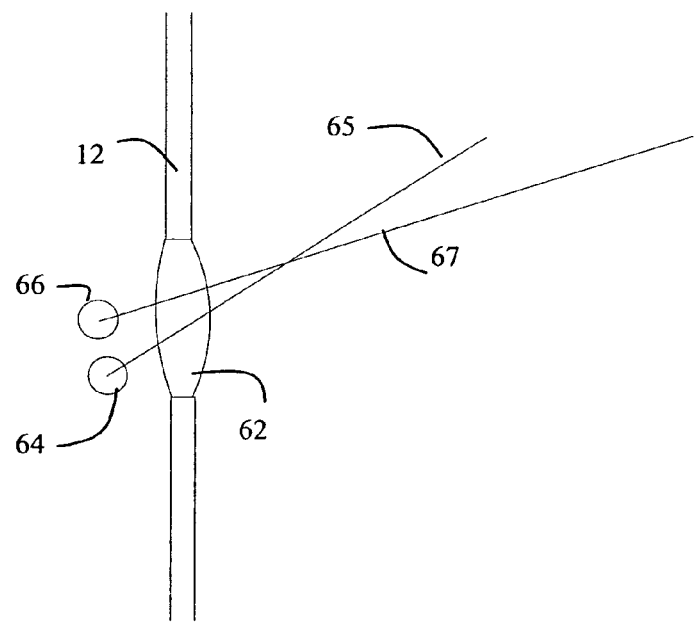
FIG. 5 is a plan view of a light beam source useable with the diffuser of FIGS. 1-4.

Emitters 50-51, 52-53 may each include a separate light emitting diode (LED) and focusing lens. However, it is also possible to use a single lens with two LEDs to provide different light beams having different angular positions from the single lens, as depicted in FIG. 5. FIG. 5 shows a single lens 62 mounted in diffuser body 12 and located adjacent to a pair of LEDs 64, 66. LED 64 and lens 62 produce a first beam 65, while LED 66 and lens 62 provide a second light beam 67. In this manner the two pairs of light beam emitters 50-51, 52-53 (FIG. 2) may be used to provide three or four separate pairs of intersecting beans and three or four corresponding repeatable distances for diffuser 10. For the purpose of avoiding physical interference between adjacent LEDs 64, 66 it is preferable that the different light beams be created for adjacent repeatable distances, from different pairs of LCDs 50-51, 52-53. That is, the separate light beams created from a single lens should have sufficient angular separation to avoid physical interference between LEDs.

The diffuser 10 is thus economical, easy to use and readily adjustable for attachment to a variety of cameras. The distance indicator improves the usefulness of close range photography by providing a repeatable scale to photographs. This repeatable scale improves the usefulness of close ranges photographs for medical and other organic growth measurement applications.

The present invention is illustratively described above in reference to the disclosed embodiments. Various modifications and changes may be made to the disclosed embodiments by persons skilled in the art without departing from the scope of the present invention as defined in the appended claims.

What is claimed is:

1. A strobe diffuser attachment for a camera, comprising:
 a diffuser body adapted for attachment to a camera;
 a pair of spaced diffuser lenses mounted in said diffuser body and adapted to be located in front of a range of different integral strobe locations for a camera attached to said body,
 wherein said pair of diffuser lenses are adapted to serially diffuse light emitted from an integral strobe of a camera attached to said body.

2. The strobe diffuser of claim 1, wherein said pair of diffuser lenses are adapted to be located in front of substantially all camera frontal surface located above approximately a center of a lens of a camera attached to the diffuser body.

3. The strobe diffuser of claim 1, wherein the diffuser body includes a front wall having a camera lens opening and is adapted for aligning a lens of a camera attached to the diffuser body with said camera lens opening.

4. The strobe diffuser of claim 3, wherein said pair of diffuser lenses are located to cover substantially all camera frontal area located above approximately a center of said camera lens opening for a camera attached to the diffuser body.

5. The strobe diffuser of claim 3, wherein the diffuser body further includes a shroud located around said camera lens opening and adapted to reduce any strobe light emissions through said camera lens opening.

6. The strobe diffuser of claim 3, wherein said diffuser body includes a platform mounted orthogonal to the front wall and adapted to allow attachment to a bottom of any one of a variety of cameras with a camera lens aligned with said camera lens opening.

7. The strobe diffuser of claim 6, wherein the platform includes one or more elongated slots aligned parallel to the front wall and adapted for camera attachment at adjustable positions along each slot to enable alignment of a camera lens with said cameral lens opening.

8. The strobe diffuser of claim 7, wherein said one or more elongated slots includes a plurality of elongated parallel slots located at different distances from the front wall.

9. The strobe diffuser of claim 8, wherein said platform includes a screw adapted to mate with a standard camera bottom screw mount through a selectable one of said plurality of elongated slots.

10. The strobe diffuser of claim 6, wherein said platform is affixed to the front wall by an adjustable slide adapted to fix the platform at an adjustable distance from said camera lens opening.

11. The strobe diffuser of claim 10, wherein said platform is rotatably mounted to the adjustable slide and adapted to allow the platform to be alternately positioned both orthogonal to the front wall for use and adjacent and parallel to the front wall for storage purposes.

12. The strobe diffuser of claim 1, further comprising an adjustable stop adapted to prevent relative rotation between said front wall and any one of a variety of cameras attached to said platform.

13. The strobe diffuser of claim 12, wherein said adjustable stop includes a spring biased stop element adapted to extend from said front wall and abut a camera attached to said platform, and further wherein said adjustable stop includes a locking device adapted to fix a position of said stop element when said stop element is abutting a camera attached to said platform.

14. The strobe diffuser of claim 1, wherein the diffuser includes a distance measurement device adapted to readily enable positioning of an object to be photographed at a repeatable distance from the diffuser body.

15. The strobe diffuser of claim 14, wherein the distance measurement device includes a pair of light beams which intersect at the repeatable distance from the diffuser body.

16. The strobe diffuser of claim 15, wherein the distance measurement device is adapted to selectively produce one of a plurality of pairs of light beams which intersect at different repeatable distances from the diffuser body.

17. The strobe diffuser of claim 15, wherein said pair of light beams are adapted to form a centering spot for aiming a camera attached to said diffuser body.

18. The strobe diffuser of claim 15, wherein each light beam is produced by an LED and a focusing lens, and further wherein different angular beams are produced from a single lens having a separate LED differently aligned with said single lens.

19. A strobe diffuser attachment for a camera, comprising:

a diffuser body adapted for attachment to a camera;

one or more diffuser lenses attached to the diffuser body and adapted to diffuse light from a strobe of a camera attached to said diffuser body; and a distance measurement device located in said diffuser body and adapted to readily enable positioning of an object to be photographed at a repeatable distance from the diffuser body, wherein the distance measurement device includes a pair of light beams which intersect at the repeatable distance from the diffuser body.

20. The diffuser of claim 19, wherein the distance measurement device is adapted to selectively produce one of a plurality of pairs of light beams each pair of which is emitted from said diffuser body at a different relative angle and intersects at a different repeatable distance from the diffuser body.

21. The diffuser of claim 20, wherein each light beam is produced by an LED and a focusing lens, and further wherein different angular beams are produced from a single lens having a separate LED differently aligned with said single lens.

22. The strobe diffuser of claim 20, wherein the measurement device includes a pair of LEDS aligned at different angular positions from a single lens to produce two different light beams having different angular relationships with the diffuser body.

23. The strobe diffuser of claim 19, wherein said pair of light beams are adapted to form a centering spot for aiming a camera attached to said diffuser body.

24. The strobe diffuser of claim 23, wherein said pair of light beams are adapted to intersect along a centerline of a lens of a camera attached to said diffuser body.

* * * * *